United States Patent
Marocchini et al.

(10) Patent No.: US 10,428,743 B2
(45) Date of Patent: Oct. 1, 2019

(54) DROP-TIGHT SPOOL AND SLEEVE FOR METERING VALVE

(71) Applicant: Hamilton Sundstrand Corporation, Charlotte, NC (US)

(72) Inventors: Francis P. Marocchini, Somers, CT (US); Aaron F. Rickis, Feeding Hills, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 269 days.

(21) Appl. No.: 15/451,788

(22) Filed: Mar. 7, 2017

(65) Prior Publication Data
US 2018/0258864 A1    Sep. 13, 2018

(51) Int. Cl.
| | |
|---|---|
| *F16K 31/06* | (2006.01) |
| *F02C 9/26* | (2006.01) |
| *F16K 3/26* | (2006.01) |
| *F16K 3/24* | (2006.01) |
| *F02C 7/232* | (2006.01) |
| *F16K 1/44* | (2006.01) |

(52) U.S. Cl.
CPC ............. *F02C 9/263* (2013.01); *F02C 7/232* (2013.01); *F16K 1/443* (2013.01); *F16K 3/243* (2013.01); *F16K 3/265* (2013.01); *F16K 3/267* (2013.01); *F16K 31/0655* (2013.01); *F16K 31/0668* (2013.01); *F16K 31/0693* (2013.01); *F05D 2220/32* (2013.01); *F05D 2260/57* (2013.01); *F05D 2300/432* (2013.01)

(58) Field of Classification Search
CPC .... F02C 9/263; F02C 7/232; F05D 2300/432; F05D 2260/57; F05D 2220/32; F16K 1/06; F16K 1/44; F16K 1/443; F16K 3/22; F16K 3/24; F16K 3/243; F16K 3/246; F16K 3/26; F16K 3/265; F16K 3/267; F16K 31/0655; F16K 31/0668; F16K 31/0693
See application file for complete search history.

(56) References Cited

U.S. PATENT DOCUMENTS

| | | | |
|---|---|---|---|
| 4,336,826 A | 6/1982 | Grawunde | |
| 4,429,716 A * | 2/1984 | Conrad | F16K 39/022 137/625.35 |
| 5,118,075 A | 6/1992 | Portolese | |
| 6,682,016 B1 | 1/2004 | Peroulakis | |
| (Continued) | | | |

OTHER PUBLICATIONS

Extended European Search Report for European Application No. 18160506.4, dated Jul. 3, 2018.

*Primary Examiner* — Ian G Paquette
(74) *Attorney, Agent, or Firm* — Carlson, Gaskey & Olds, P.C.

(57) ABSTRACT

A spool and sleeve assembly for a metering valve comprises a spool body defining a center axis, and a sleeve body having a bore that receives the spool body. The sleeve body includes at least one metering window open to the bore and is moveable between a metering position to control flow through the metering window and a shutoff position where flow is prevented from exiting an outlet end of the bore. A seal assembly reacts between the spool body and the sleeve body to provide at least a first sealing interface and a second sealing interface axially spaced from the first sealing interface when the spool body is in the shutoff position. A metering valve for a fuel system is also disclosed.

24 Claims, 8 Drawing Sheets

(56) References Cited

U.S. PATENT DOCUMENTS

| | | |
|---|---|---|
| 6,684,895 B2 | 2/2004 | Sclease et al. |
| 9,212,608 B2 | 12/2015 | Ballard et al. |
| 9,255,558 B2 | 2/2016 | Burke et al. |
| 2014/0109544 A1 | 4/2014 | Rickis |
| 2014/0109585 A1 | 4/2014 | Rickis |
| 2014/0109979 A1 | 4/2014 | Rickis |
| 2014/0109983 A1 | 4/2014 | Rickis |
| 2014/0110618 A1 | 4/2014 | Rickis |
| 2016/0215891 A1 | 7/2016 | Thomson et al. |
| 2017/0051676 A1 | 2/2017 | Geiger |
| 2017/0314684 A1* | 11/2017 | Jones .................. F16J 9/08 |

\* cited by examiner

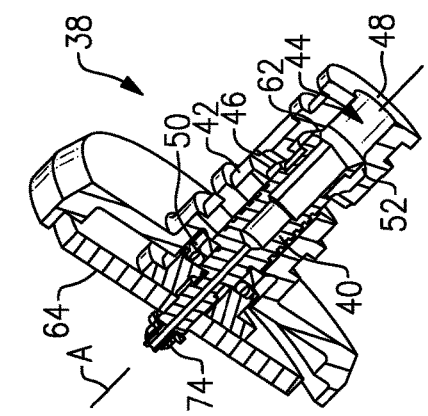
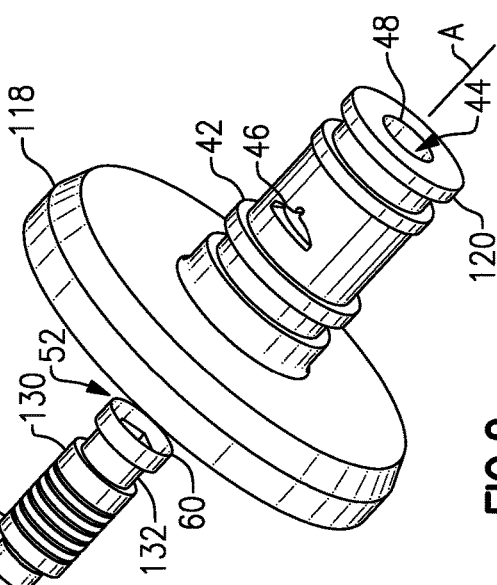
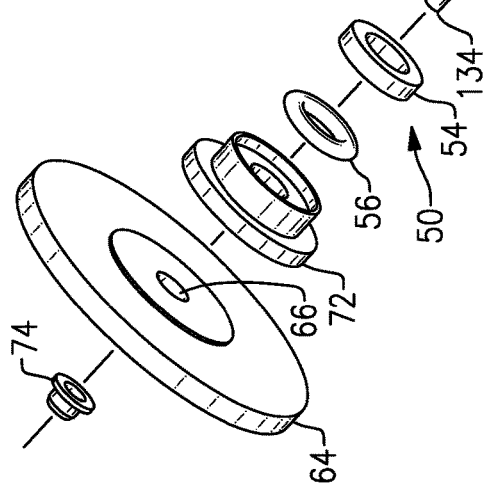
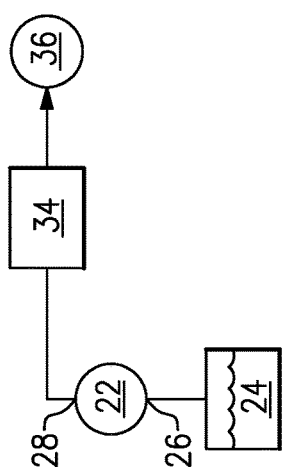

DROP-TIGHT SPOOL AND SLEEVE FOR METERING VALVE

BACKGROUND OF THE INVENTION

This application relates to a spool and sleeve assembly for a metering valve which may be utilized in a fuel system for an aircraft engine.

A gas turbine engine is typically used to power an aircraft. A fuel system provides fuel to various portions of the gas turbine engine. Fuel is primarily delivered into a combustor section of the gas turbine engine. Airflow through the gas turbine engine is compressed by one or more compressors, mixed and burned with fuel in the combustor, and then expanded over one or more turbines. The fuel is supplied to the gas turbine engine by a fuel pump from a fuel supply and a metering valve.

The metering valve supplies a specified amount of fuel to the engine for various operating conditions. A singular pressure fuel metering system relies on pressure balanced metering to prevent pressure variation error. Traditionally, metering valves have utilized a bellows configuration to negate system pressure error. However, the use of bellows increases the cost and complexity of the valve.

SUMMARY OF THE INVENTION

A spool and sleeve assembly for a metering valve comprises a spool body defining a center axis, and a sleeve body having a bore that receives the spool body. The sleeve body includes at least one metering window open to the bore and is moveable between a metering position to control flow through the metering window and a shutoff position where flow is prevented from exiting an outlet end of the bore. A seal assembly reacts between the spool body and the sleeve body to provide at least a first sealing interface and a second sealing interface axially spaced from the first sealing interface when the spool body is in the shutoff position. A metering valve for a fuel system is also disclosed.

These and other features may be best understood from the following drawings and specification.

BRIEF DESCRIPTION OF THE DRAWINGS

FIG. 1 shows a highly schematic view of a fuel system for an aircraft.

FIG. 2 is an exploded view of a metering valve as used in the system of FIG. 1.

FIG. 3 is a perspective view of the metering valve of FIG. 2 as assembled.

DETAILED DESCRIPTION

Figure 4:
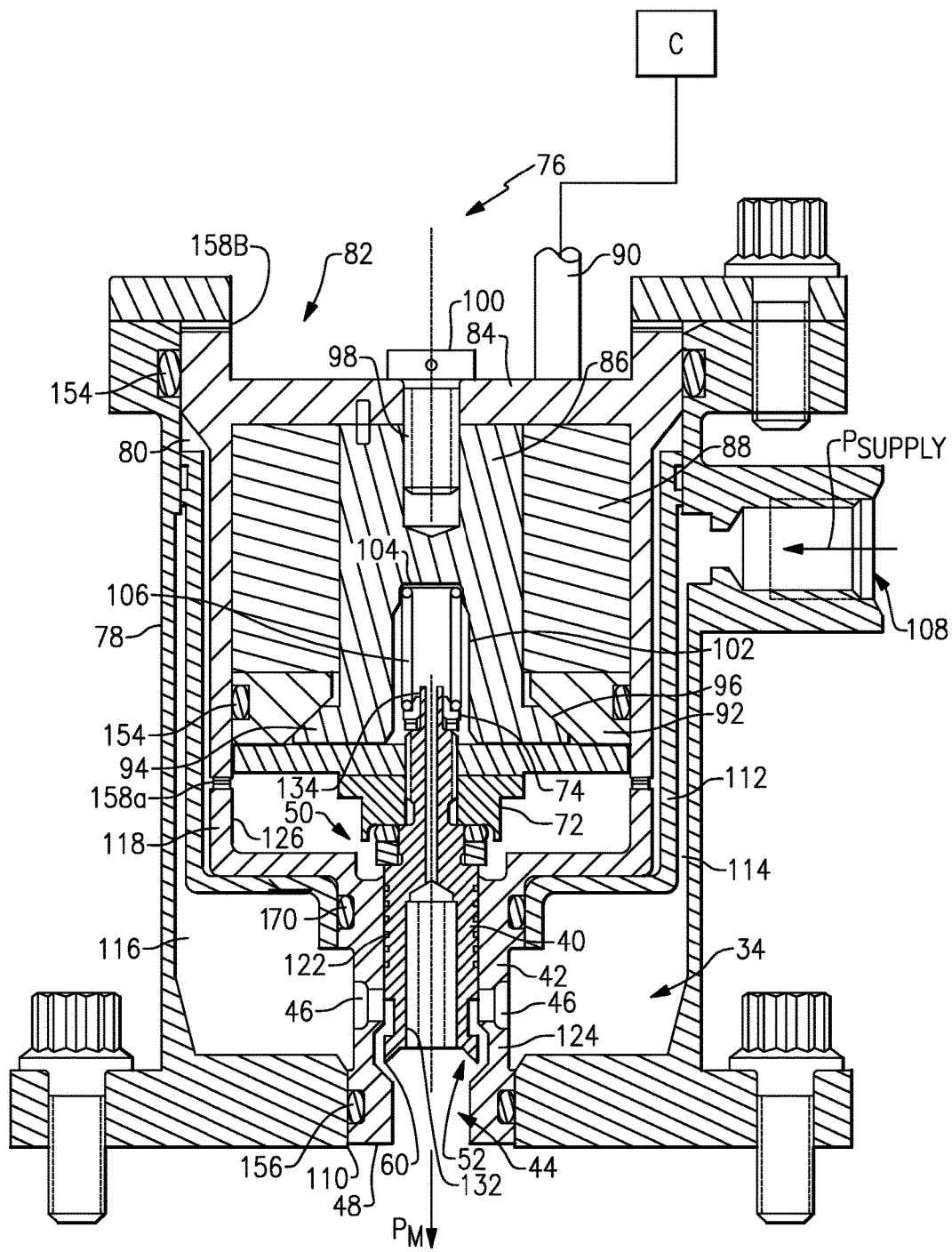
FIG. 4 is a section view of a metering module assembly including the metering valve of FIG. 3 and which is in the metering position.

FIG. 1 shows a highly schematic view of an aircraft fuel supply system 20 having a fuel pump 22 drawing fuel from a fuel supply 24. The pump 22 has a pump inlet 26 in fluid communication with the fuel supply 24 and a pump outlet 28 in fluid communication with a metering valve 34. Fuel exiting the metering valve 34 is used to supply fuel to an engine 36, such as a gas turbine engine for an aircraft for example. As known, the fuel supply system 20 may also include additional components such as a pressure regulating valve, relief valve, pressure sensors, etc. (not shown).

FIGS. 2-6 show the metering valve in greater detail. A spool and sleeve assembly 38 of the metering valve 34 includes a spool body 40 defining a center axis A and a sleeve body 42 having a bore 44 that receives the spool body 40. The sleeve body 42 includes at least one metering window 46 open to the bore 44. The spool body 40 is moveable between a metering position (FIG. 4) to control flow through the metering windows 46 and a shutoff position (FIG. 5) where flow is prevented from exiting an outlet end 48 of the bore 44.

A seal assembly reacts between the spool body 40 and the sleeve body 42 to provide at least a first sealing interface 50 and a second sealing interface 52 axially spaced from the first sealing interface 50 when the spool body 40 is in the shutoff position. The first sealing interface 50 comprises a compliant seal assembly and the second sealing interface 52 comprises a direct contact interface. The compliant seal assembly comprises at least a compliant seal 54 and a rubber seal 56, for example. In one example, the compliant seal 54 comprises a seal member made from a polytetrafluoroethylene (PTFE) material and the rubber seal 56 comprises a rubber o-ring. The direct contact interface comprises a direct contact area 58 (FIG. 5) between an end 60 of the spool body 40 and an inner surface 62 of the bore 44. In one example, the direct contact comprises a metal-to-metal contact interface.

A plunger 64 is coupled to the spool body 40 for movement therewith in a direction along the central axis A. In one example, the plunger 64 comprises a disc-shaped body having a center opening 66 through which an end 68 of the spool body 40 extends. In one example, the spool body 40 includes a threaded surface portion 70 and the opening 66 of the plunger 64 comprises a threaded surface that is engaged with the threaded surface portion 70 of the spool body 40. A spacer 72 is also coupled to the spool body 40 and is positioned axially between the plunger 64 and the compliant seal assembly 50. A spring seat 74 is also attached to the distal end 68 of the spool body 40.

Figure 5:
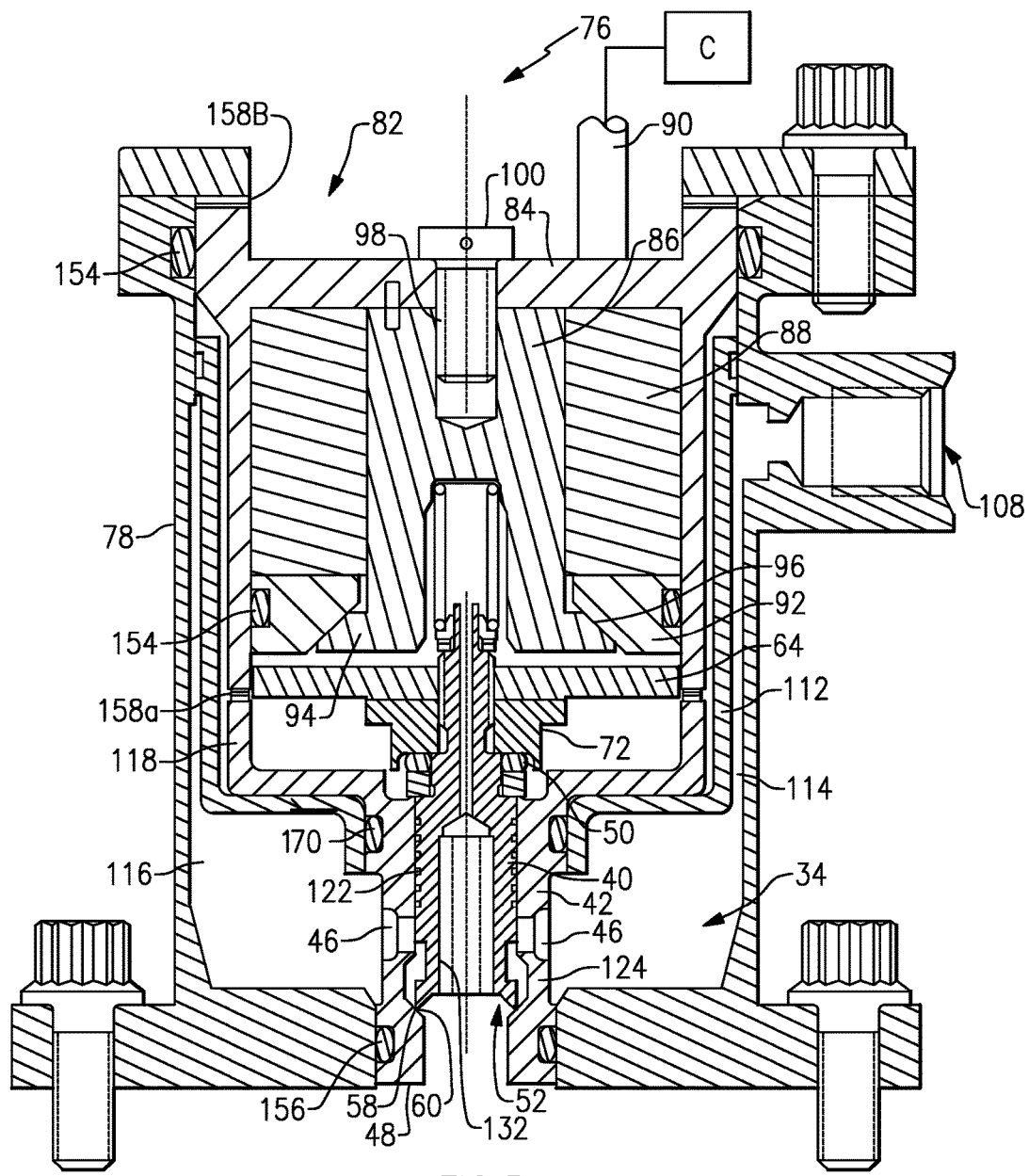
FIG. 5 is a view similar to FIG. 4 but showing the shutoff position.

The spool and sleeve assembly 38 of the metering valve 34 is incorporated into a metering module assembly 76 shown in FIGS. 4-5. The metering module assembly 76 includes a housing 78 with an internal cavity 80 that receives an actuator device such as a solenoid 82, for example. The solenoid 82 includes an outer housing 84 and an inner core 86 spaced radially inward of the outer housing 84. A solenoid coil 88 is wound around the inner core 86 and receives power through connection to a wiring cable 90. An end cap member 92 fits within the outer housing 84 and abuts against an end face of the coil 88. The inner core 86 includes a radial flange 94 with a tapered surface that abuts an inner tapered surface 96 of the end cap member 92.

The inner core 86 includes a first recess 98 that receives a fastener 100 to secure the inner core 86 to the outer housing 84. The inner core 86 includes a second recess 102 at an opposite end that forms a spring seat 104 for a spring 106. The spring 106 is received within the second recess 102 and reacts between the spring seat 104 in the second recess 102 and the spring seat 74 fixed to the distal end 68 of the spool body 40.

The housing 78 of the metering module assembly 76 includes an inlet 108 that receives fuel from the pump 22 and fuel supply 24 as known, and an outlet 110 through which fuel is directed to the gas turbine engine 36. A secondary housing member 112 is positioned radially between the housing 78 and solenoid housing 84. The plunger 64 and a portion of the spool and sleeve assembly 38 are received within the secondary housing member 112.

A chamber 114 is formed radially between the secondary housing member 112 and the housing 78 of the module assembly 76. The chamber 114 feeds into a larger chamber area 116 located near the outlet 110 of the housing 78. The metering windows 46 of the sleeve body 42 receive fuel from chamber area 116 and meter the amount of fuel that exits the outlet end 48 of the bore 44 when in the metering position.

The sleeve body 42 has a cup-shaped portion 118 at an end that is opposite the outlet end 48 of the bore 44. The cup-shaped portion 118 has a greater diameter than an opposite end 120 of the sleeve body 42 that includes the outlet end 48 of the bore 44. The bore 44 has at least a first portion 122 defined by a first diameter and a second portion 124 that is defined by a second diameter that is greater than the first diameter. The first portion 122 is in sliding engagement with an outer surface of the spool body 40. The second portion 124 provides an enlarged area near the distal end 60 of the spool body 40. An inner surface 126 of the cup-shaped portion 118 is defined by a third diameter that is greater than the second diameter. The spacer 72 and compliant seal assembly 50 are received within the cup-shaped portion 118.

The spool body 40 is defined by an outermost diameter at a central portion 130 of the spool body 40 (FIG. 2). This central portion 130 is in direct engagement with the first portion 122 of the bore 44 (FIG. 4). The spool body 40 includes a first reduced diameter portion 132 that is axially between the central portion 130 and the distal end 60 of the spool body 40. The distal end 60 of the spool body 40 has an increased diameter relative to the first reduced diameter portion 132. The distal end 60 terminates at a gripping surface that forms the second sealing interface 52. The spool body 40 also includes a second reduced diameter portion 134 at an opposite end that is defined by a diameter that is less than the outermost diameter at the central portion 130. The spring seat 74, plunger 64, spacer 72, and compliant seal assembly 50 surround second reduced diameter portion 134.

The first reduced diameter portion 132 of the spool body 40 at least partially overlaps with the metering windows 46 when in the metering position such that fuel can exit the outlet end 48 of the bore 44 when in the metering position. The solenoid actuating device 82 cooperates with the plunger 64 to move the spool body 40 between the metering and shutoff positions. The spring 106 biases the spool and sleeve assembly 38 to the shutoff position (FIG. 5) such that the plunger 64 is axially spaced from the inner core 86 and the end member 92 of the solenoid 82.

When the solenoid 82 is powered/energized via the wiring cable 90, the plunger 64 is magnetically attracted toward the solenoid 82 to move the spool and sleeve assembly 38 to a metering position (FIG. 4). A control unit C is programmed to control the amount of open overlapping area between the metering windows 46 and the first reduced diameter portion 132 such that fuel is metered to achieve desired operating conditions as known. For example, the control unit C controls the proportional solenoid 82 which has a current versus displacement relationship which varies the spool/metering window. Thus, fuel enters the inlet of the housing 78 via the inlet at a first pressure Psupply and exits the housing 78 at the outlet 110 at a metered pressure Pm.

A drop tight sealing effect is achieved when the solenoid 82 is de-energized and the resilient biasing force of the spring 106 returns the spool and sleeve assembly 38 to the shutoff position. This is shown in greater detail in FIGS. 6-8. The drop tight sealing is achieved by reducing the leakage gaps to zero. As discussed above, the spool and sleeve assembly 38 includes a first sealing interface 50 and second sealing interface 52, where the first sealing interface 50 comprises a compliant seal assembly and the second sealing interface 52 comprises a direct contact interface.

Figure 6:
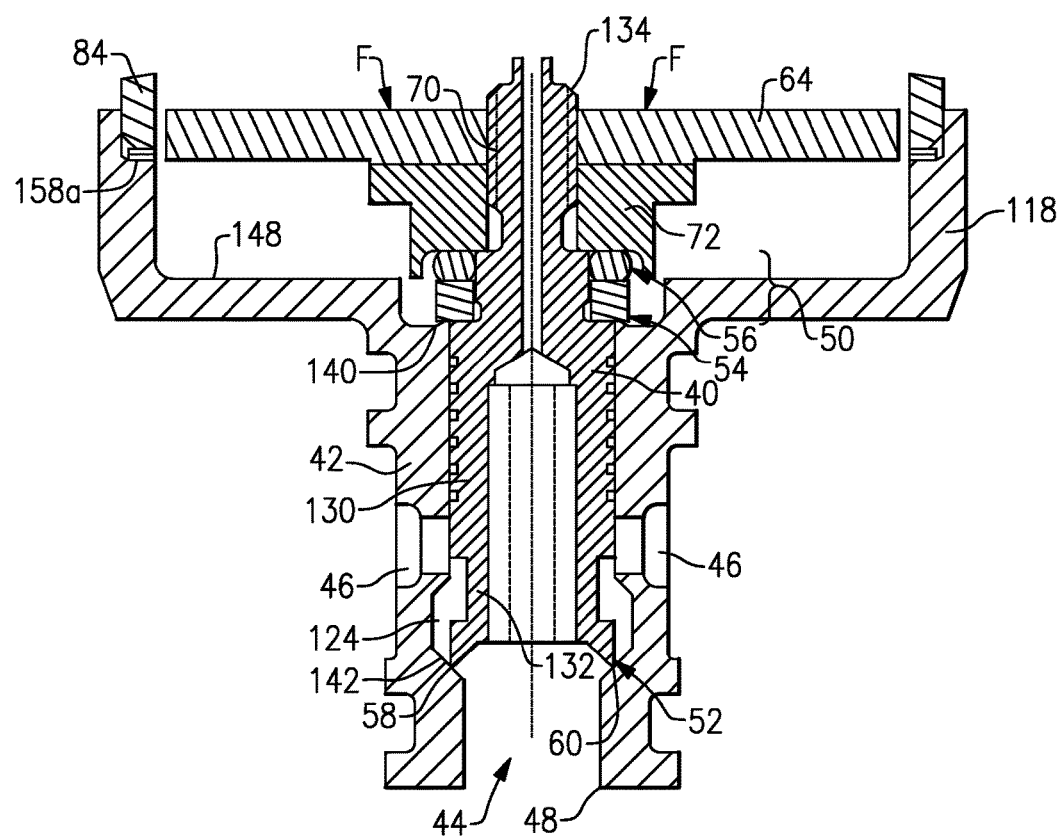
FIG. 6 is a magnified view of a spool and sleeve assembly of the metering valve and which shows synchronized sealing in the shutoff position.
Figure 7:
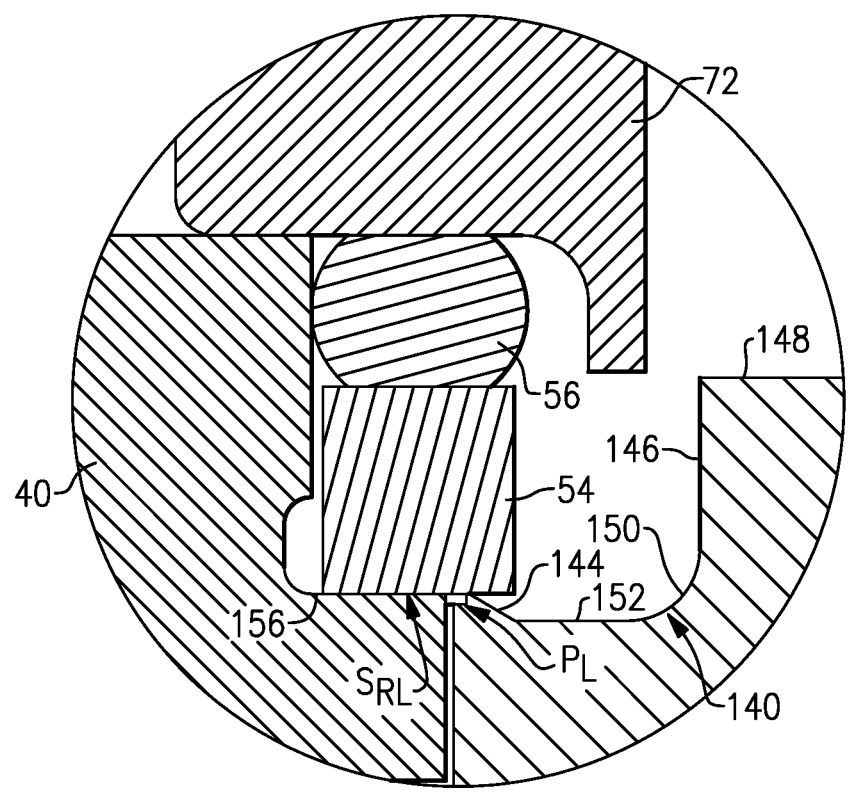
FIG. 7 is a magnified detail view of a first sealing interface as identified in FIG. 6.

As shown in FIG. 6, the bore 44 includes a first seat 140 for the compliant seal assembly and a second seat 142 for the direct contact interface. The compliant seal assembly 50 comprises at least a compliant seal 54 and a rubber o-ring seal 56 that is used to compensate for thermal growth changes. In one example, the o-ring seal 56 is stacked on top of the compliant seal 54. The first seat 140 includes a protruding portion 144 that engages the compliant seal 54 as best shown in FIG. 7. The bore 44 includes a first axial portion 146 that extends from a bottom surface 148 of the cup-shaped portion 118 in a direction toward the outlet end 48 of the bore 44. A curved surface portion 150 transitions from the first axial portion 146 to a linear shoulder portion 152 that extends radially inwardly relative to the first axial portion 146. The protruding portion 144 transitions from the linear shoulder portion 152 as a ramped surface that extends radially inwardly at an angle that extends in a direction toward the compliant seal 54.

The spool body 40 includes a first shoulder 156 that exerts a seal reaction load $S_{RL}$ at a radially inward portion of the compliant seal 54 when in the shutoff position. The protruding portion 144 exerts a pressure load $P_L$ against a radially outward portion of the compliant seal 54 when in the shutoff position. The compliant seal assembly 50 is thus compressed directly between the spacer 72 and the protruding portion 144 of the first seat 140 and the spool shoulder 156 when in the shutoff position. The spacer 72 includes a radially outer flange to retain the o-ring 56 in position.

The direct contact interface of the second sealing interface 52 comprises the direct contact area 58 (FIG. 6) between the distal end 60 of the spool body 40 and the second seat 142 when in the shutoff position. The second portion 124 of the bore 44 provides an enlarged area near the end 60 of the spool body 40. The second seat 142 comprises a surface that transitions from the second portion 124 of the bore 44 to the outlet end 48 of the bore 44 which has a smaller diameter than the second portion 124. In one example, the second seat 142 comprises a ramped surface to create a wedge-like gripping effect as the end 60 of the spool body 40 engages the second seat 142.

Figure 8:
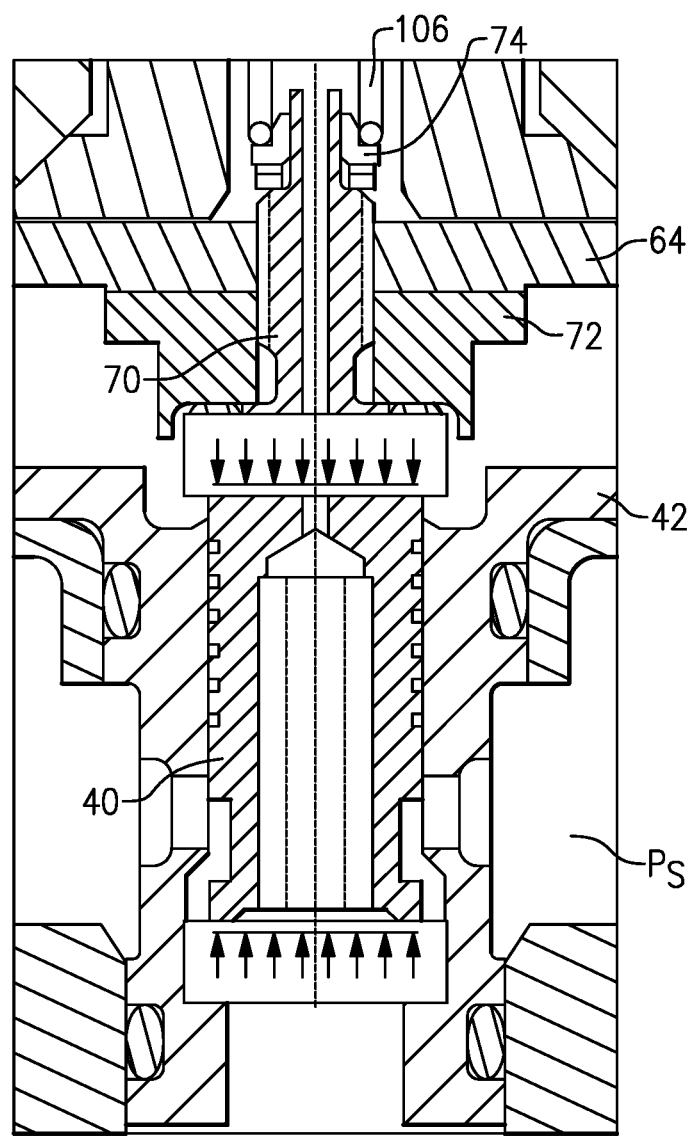
FIG. 8 is a magnified section view showing pressure being balanced across the spool.

As the solenoid 82 is de-energized and the spring force returns the spool and sleeve assembly 38 to the shutoff position, a balanced return force F (FIG. 6) is provided such that there is a simultaneous and synchronized sealing effect at the first 50 and second 52 sealing interfaces. This creates balanced pressure across the spool body 40 as shown in FIG. 8.

The metering module assembly 76 includes additional seals 154 to seal the solenoid 82 within the housing 78 and to provide sealing within the solenoid 82. Additional seals 170 are also used to seal the sleeve body 42 within the housing 78 and secondary housing member 112. Magnetic shimming 158a is used to facilitate positioning of the solenoid 82 relative to the cup-shaped portion 118 of the spool and sleeve assembly 38. End play shimming 158b is used to facilitate positioning of the solenoid 82 within the housing 78.

Figure 9A:
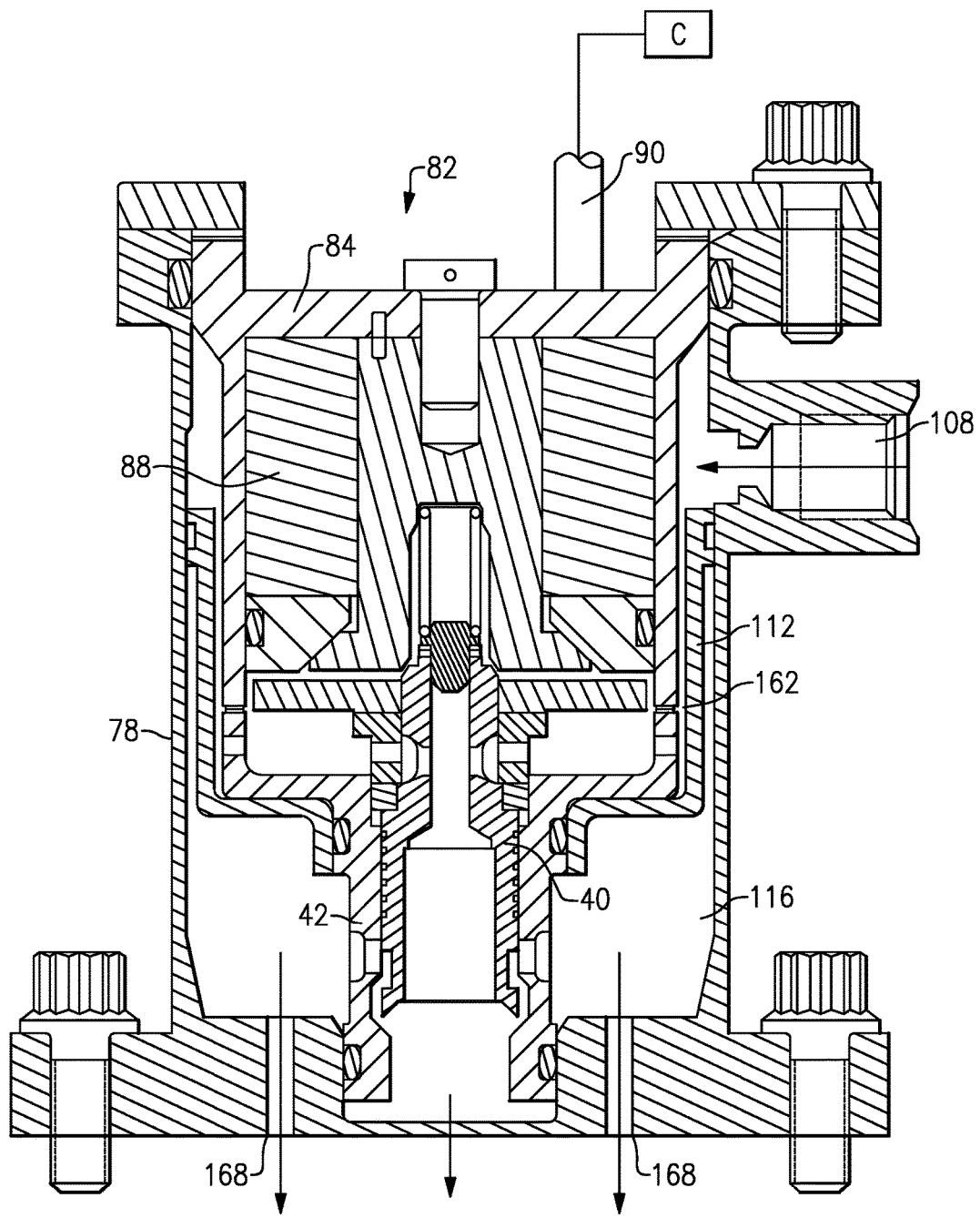
FIG. 9A is a section view of a metering module assembly with another example of a spool and sleeve assembly.
Figure 9B:
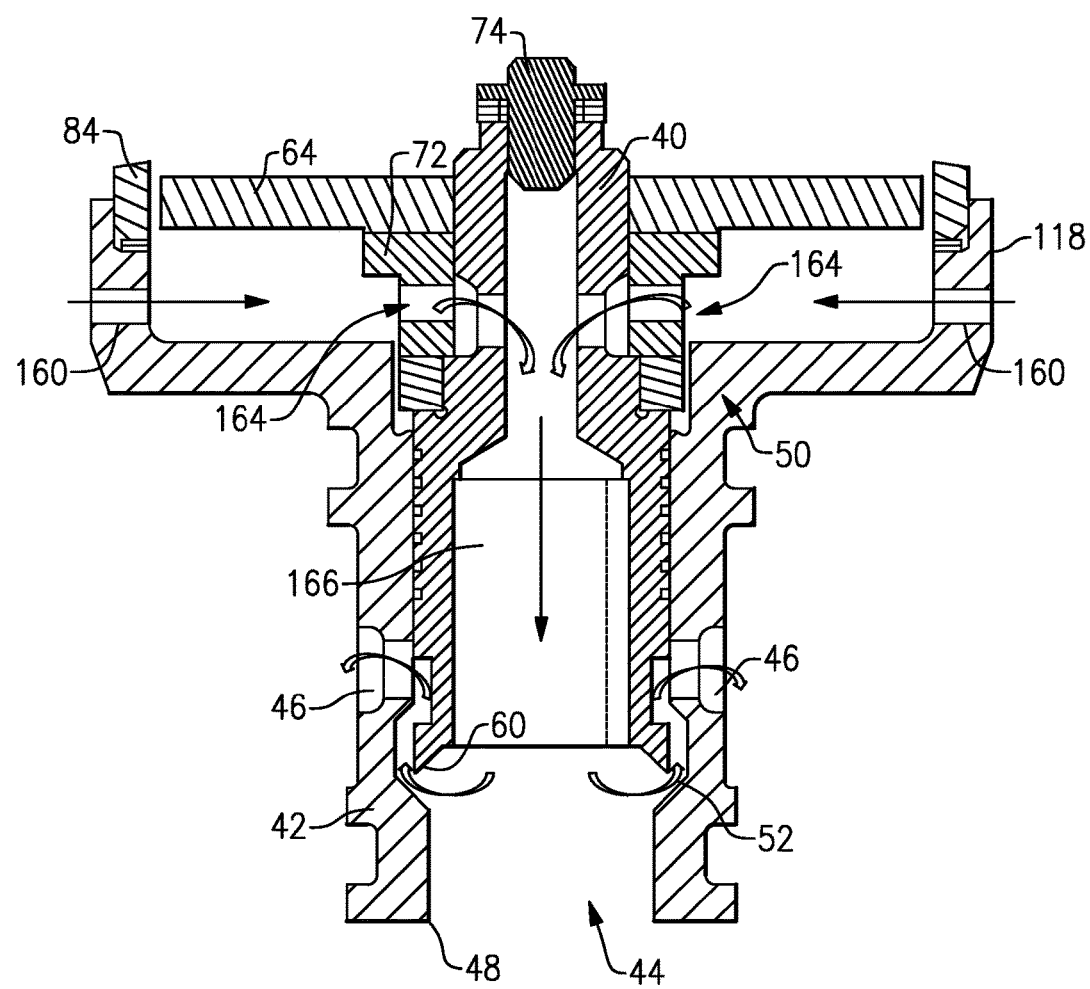
FIG. 9B is a view similar to 9A but showing a reversed flow application.

FIGS. 9A-9B show an optional reversed flow embodiment wherein an outer wall of the cup-shaped portion 118 includes one or more inlet ports 160 that receive fuel from the inlet 108 and direct fuel into a chamber 162 formed between the secondary housing member 112 and the solenoid housing 84. One or more ports 164 are formed in the spool body 40 and spacer 72 to direct fuel from the chamber 162 into an interior cavity 166 of the spool body 40. An end of the housing 78 is closed at the outlet end of the bore 44 such that one or more radially outward outlet ports 168 are formed in the housing 78 to direct fuel flow from the chamber 116 to the engine 36. The control unit C controls the overlap between the metering windows 46 and reduced diameter portion 134 such that fuel flows from the interior cavity 166 of the spool body 40 to the metering windows 46. The fuel is then directed into the chamber 116 and exits the outlet ports 168 when in the metering position. The first 50 and second 52 sealing interfaces provide drop tight sealing as described above.

The subject invention uses a unique spool and sleeve assembly 38 to provide a metering valve 34 that facilitates fuel metering and fuel shutoff. The moveable spool body 40 provides scheduled fuel delivery with pressure balance to prevent fuel flow variation due to pressure changes. Further, the spool and sleeve assembly 38 provides a dual synchronized sealing arrangement that provides drop tight sealing in the shut off position. Also, the module assembly requires less operating force which allows for smaller packaging and smaller motors to power the system.

The subject spool and sleeve assembly 38 also eliminates several components that were required for prior metering module assemblies. The spool and sleeve assembly 38 provide for centering of the plunger 64 which eliminates the need for a flexure component. Additionally, as the spool and sleeve assembly 38 provides pressure balance during operation, (FIG. 8) there is no longer a need for a nozzle/bellows assembly. Finally, the use of the spring 106 provides a preload for the vibe environment and a current/force gain control which is low cost compared to prior designs.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A spool and sleeve assembly for a metering valve comprising:
   a spool body extending between a first end portion and a second end portion to define a center axis, and wherein the spool body has an outermost diameter at a central portion between the first and second end portions and a first reduced diameter portion that is axially between the central portion and the second end portion of the spool body, and wherein the second end portion of the spool body has an increased diameter relative to the first reduced diameter portion;
   a sleeve body having a bore that receives the spool body, the sleeve body including at least one metering window open to the bore, and wherein the spool body is moveable between a metering position to control flow through the metering window and a shutoff position where flow is prevented from exiting an outlet end of the bore, and wherein the first reduced diameter portion of the spool body at least partially overlaps with the at least one metering window when in the metering position; and
   a seal assembly reacting between the spool body and the sleeve body to provide at least a first sealing interface associated with the first end portion of the spool body and a second sealing interface associated with the second end portion of the spool body and axially spaced from the first sealing interface when the spool body is in the shutoff position.

2. The spool and sleeve assembly according to claim 1, wherein the spool body includes a second reduced diameter portion between the first end portion and the central portion that is defined by a diameter that is less than the outermost diameter at the central portion, and wherein the compliant seal assembly surrounds the second reduced diameter portion.

3. The spool and sleeve assembly according to claim 1, wherein the bore includes a first seat for the first sealing interface and a second seat for the second sealing interface, and wherein the first seat comprises a linear shoulder portion that extends in a radially inward direction and includes a protruding portion that engages the compliant seal, and wherein the protruding portion transitions from the linear shoulder portion as a ramped surface that extends radially inward at an angle that extends in a direction toward the compliant seal, and wherein the spool body includes a first shoulder that exerts a seal reaction load at a radially inward portion of the compliant seal when in the shutoff position, and wherein the protruding portion exerts a pressure load against a radially outward portion of the compliant seal when in the shutoff position.

4. The spool and sleeve assembly according to claim 1, wherein the first sealing interface comprises a compliant seal assembly and the second sealing interface comprises a direct contact interface.

5. The spool and sleeve assembly according to claim 4, wherein the compliant seal assembly comprises at least a compliant seal and a rubber seal.

6. The spool and sleeve assembly according to claim 4, wherein the second end portion terminates at a distal end gripping surface, and wherein the direct contact interface comprises direct contact between the distal end gripping surface of the spool body and an inner surface of the bore to form the second sealing interface.

7. The spool and sleeve assembly according to claim 6, wherein the direct contact comprises metal-to-metal contact.

8. The spool and sleeve assembly according to claim 4, wherein the bore includes a first seat for the first sealing interface and wherein the first seat includes a protruding portion that engages the compliant seal assembly.

9. The spool and sleeve assembly according to claim 8, wherein the spool body includes a first shoulder that supports a radially inward portion of the compliant seal assembly and wherein the protruding portion exerts a pressure load against a radially outward portion of the compliant seal assembly when in the shutoff position.

10. The spool and sleeve assembly according to claim 8, wherein the sleeve body includes a second seat for the second sealing interface, and wherein the spool body includes the second end portion that faces the outlet end of the bore, and wherein the second end portion terminates at a distal end gripping surface that directly engages the second seat when in the shutoff position.

11. The spool and sleeve assembly according to claim 10, including a plunger coupled to the spool body for movement therewith and an actuator device that cooperates with the plunger to move the spool body between the metering and shutoff positions.

12. The spool and sleeve assembly according to claim 10, wherein the metering window is configured to receive fuel from a gas turbine engine fuel supply, and wherein the first reduced diameter portion at least partially overlaps with the at least one metering window when in the metering position such that fuel can exit the outlet end of the bore when in the metering position.

13. A metering valve for a fuel system comprising:
a fuel pump drawing fuel from a fuel supply;
a metering valve receiving fuel from the fuel supply, and wherein fuel exiting the metering valve is directed to an engine, wherein the metering valve includes
a spool body extending between a first end portion and a second end portion to define a center axis, and wherein the spool body has an outermost diameter at a central portion between the first and second end portions and a first reduced diameter portion that is axially between the central portion and the second end portion of the spool body, and wherein the second end portion of the spool body has an increased diameter relative to the first reduced diameter portion
a sleeve body having a bore that receives the spool body, the sleeve body including at least one metering window open to the bore, and wherein the spool body is moveable between a metering position to control flow through the metering window and a shutoff position where flow is prevented from exiting an outlet end of the bore, and wherein the first reduced diameter portion of the spool body at least partially overlaps with the at least one metering window when in the metering position and
a seal assembly reacting between the spool body and the sleeve body to provide at least a first sealing interface associated with the first end portion of the spool body and a second sealing interface associated with the second end portion of the spool body and axially spaced from the first sealing interface when the spool body is in the shutoff position, and
a plunger coupled to the spool body for movement therewith; and
an actuator device that cooperates with the plunger to move the spool body between the metering and shutoff positions.

14. The metering valve according to claim 13, wherein the actuator device comprises a solenoid and the engine comprises a gas turbine engine.

15. The metering valve according to claim 13, wherein the spool body includes a second reduced diameter portion between the first end portion and the central portion that is defined by a diameter that is less than the outermost diameter at the central portion, and wherein the compliant seal assembly surrounds the second reduced diameter portion.

16. The metering valve according to claim 13, wherein the bore has at least a first portion defined by a first diameter and a second portion that is defined by a second diameter that is greater than the first diameter, and wherein the first portion is in direct sliding engagement with the central portion of the spool body and the second portion provides an enlarged area that at least partially overlaps with the first reduced diameter portion of the spool body, and wherein the bore includes an outlet that is downstream of the enlarged area.

17. The metering valve according to claim 13, wherein the bore includes a first seat for the first sealing interface and a second seat for the second sealing face, and wherein the first sealing interface comprises a compliant seal that is compressed directly against the first seat and the second sealing interface comprises a direct contact between the second seat and the second end portion of the spool body when in the shutoff position.

18. The metering valve according to claim 17, wherein the compliant seal comprises a polytetrafluoroethylene (PTFE) seal body and an o-ring.

19. The metering valve according to claim 17, wherein the second sealing interface comprises a metal-to-metal seal.

20. The metering valve according to claim 17, wherein the first seat comprises a linear shoulder portion that extends in a radially inward direction and includes a protruding portion that engages the compliant seal, and wherein the protruding portion transitions from the linear shoulder portion as a ramped surface that extends radially inward at an angle that extends in a direction toward the compliant seal, and wherein the spool body includes a first shoulder that exerts a seal reaction load at a radially inward portion of the compliant seal when in the shutoff position, and wherein the protruding portion exerts a pressure load against a radially outward portion of the compliant seal when in the shutoff position.

21. The metering valve according to claim 17, wherein the first seat includes a protruding portion that engages the compliant seal.

22. The metering valve according to claim 21, wherein the second seat comprises a surface that extends transversely relative to the center axis.

23. A spool and sleeve assembly for a metering valve comprising:
a spool body defining a center axis;
a sleeve body having a bore that receives the spool body, the sleeve body including at least one metering window open to the bore, and wherein the spool body is moveable between a metering position to control flow through the metering window and a shutoff position where flow is prevented from exiting an outlet end of the bore;
a seal assembly reacting between the spool body and the sleeve body to provide at least a first sealing interface and a second sealing interface axially spaced from the first sealing interface when the spool body is in the shutoff position;
wherein the first sealing interface comprises a compliant seal assembly and the second sealing interface comprises a direct contact interface;
wherein the bore includes a first seat for the first sealing interface and wherein the first seat includes a protruding portion that engages the compliant seal assembly;
wherein the sleeve body includes a second seat for the second sealing interface, and wherein the spool body includes a distal end that faces the outlet end of the bore, and wherein the distal end directly engages the second seat when in the shutoff position;
a plunger coupled to the spool body for movement therewith and an actuator device that cooperates with the plunger to move the spool body between the metering and shutoff positions; and
a spacer coupled to the spool body and positioned axially between the plunger and the first seat such that the compliant seal assembly is compressed between the spacer and the first seat when in the shutoff position.

24. A metering valve for a fuel system comprising:
a fuel pump drawing fuel from a fuel supply;
a metering valve receiving fuel from the fuel supply, and wherein fuel exiting the metering valve is directed to an engine, wherein the metering valve includes
 a spool body defining a center axis,
 a sleeve body having a bore that receives the spool body, the sleeve body including at least one metering window open to the bore, and wherein the spool body is moveable between a metering position to control flow through the metering window and a shutoff position where flow is prevented from exiting an outlet end of the bore, and
 a seal assembly reacting between the spool body and the sleeve body to provide at least a first sealing interface and a second sealing interface axially spaced from the first sealing interface when the spool body is in the shutoff position,
 wherein the bore includes a first seat for the first sealing interface and a second seat for the second sealing face, and wherein the first sealing interface comprises a compliant seal that is compressed directly against the first seat and the second sealing interface comprises a direct contact between the second seat and an end of the spool body when in the shutoff position,
 a plunger coupled to the spool body for movement therewith,
 an actuator device that cooperates with the plunger to move the spool body between the metering and shutoff positions, and
 a spacer coupled to the spool and positioned axially between the plunger and the first seat such that the compliant seal is compressed between the spacer and the first seat when in the shutoff position.

\* \* \* \* \*